March 31, 1964 W. H. CRAWFORD 3,126,981
CHECK STAND
Filed Dec. 17, 1959 6 Sheets-Sheet 1
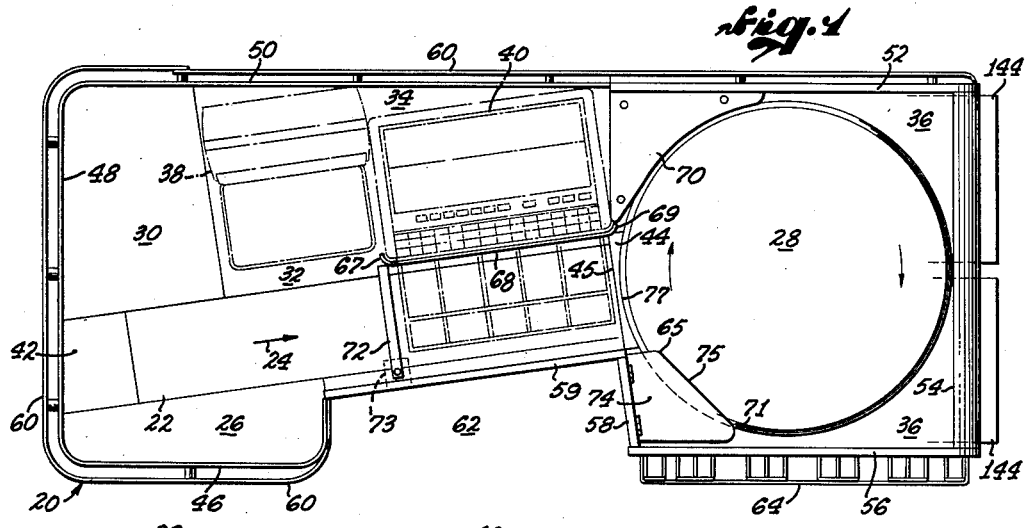
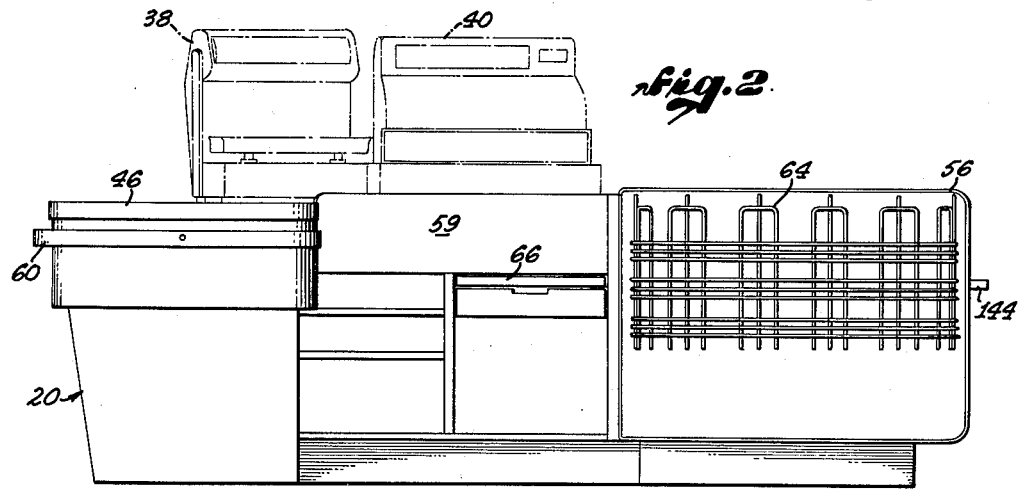
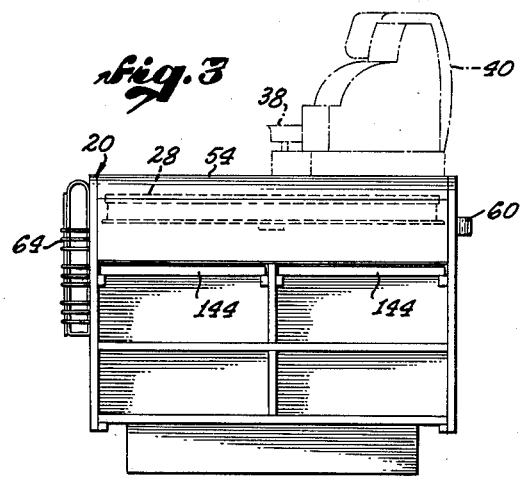
WAYLAND H. CRAWFORD,
INVENTOR.
BY
ATTORNEY.

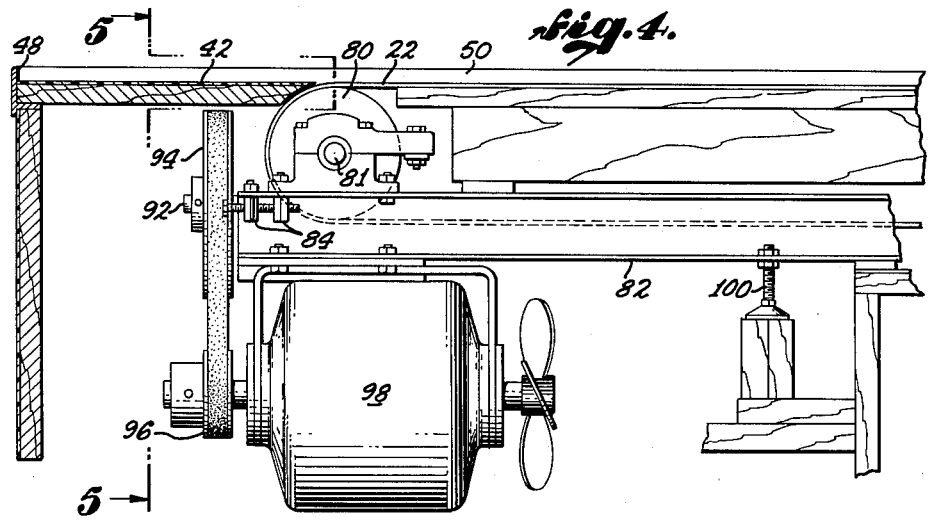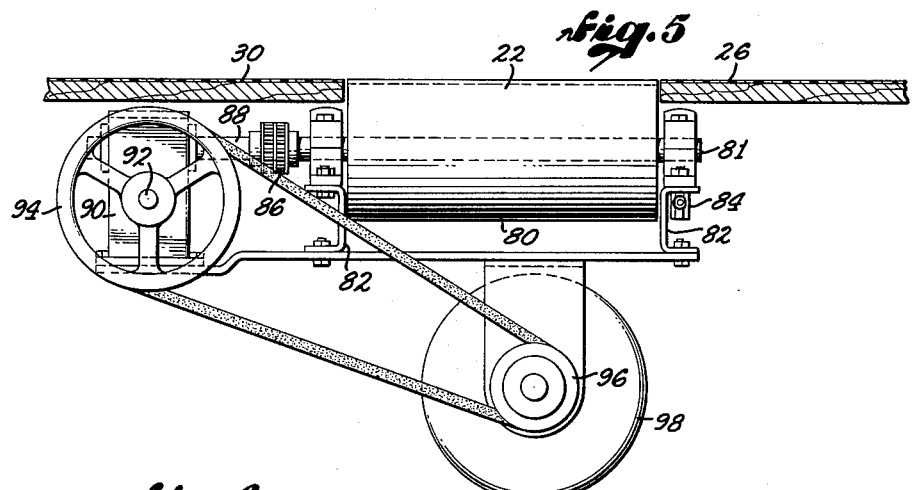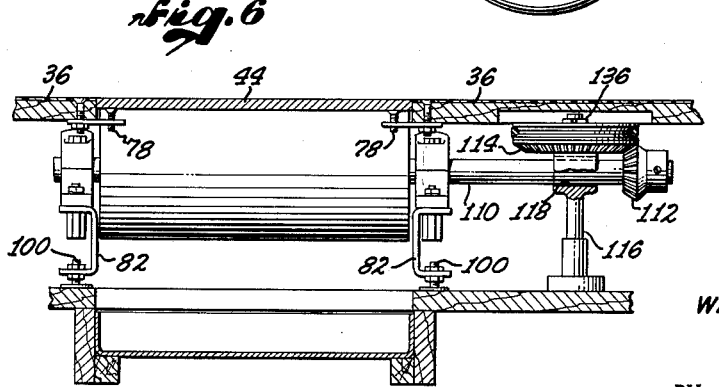

March 31, 1964   W. H. CRAWFORD   3,126,981
CHECK STAND
Filed Dec. 17, 1959   6 Sheets-Sheet 3
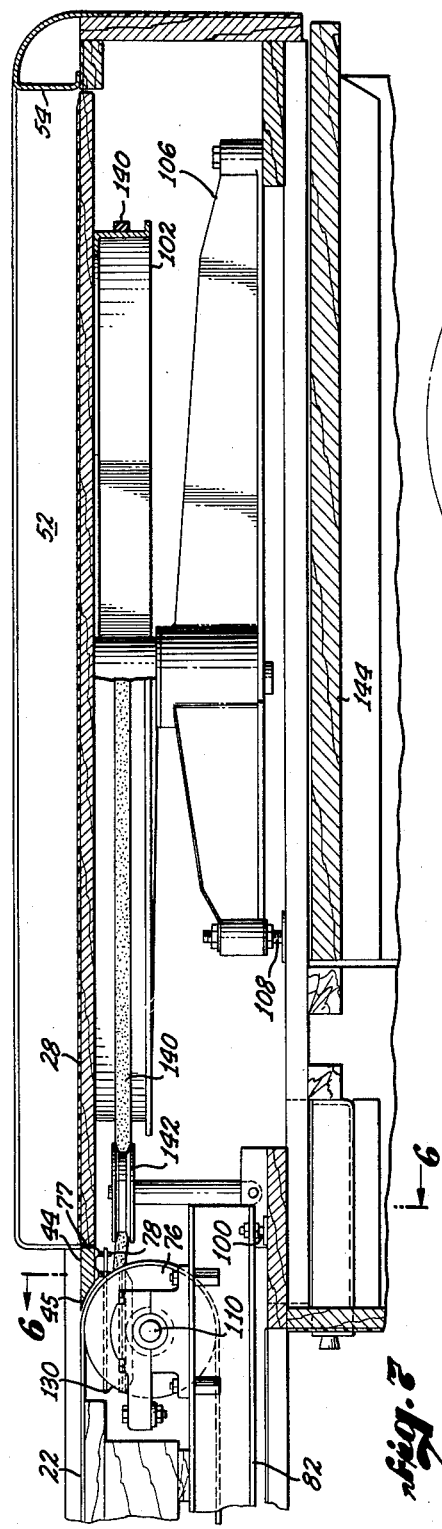
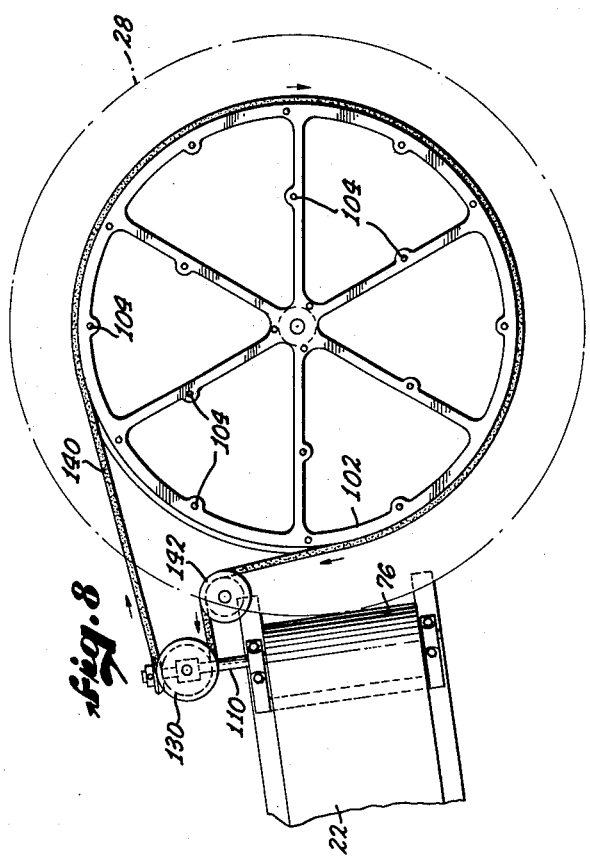
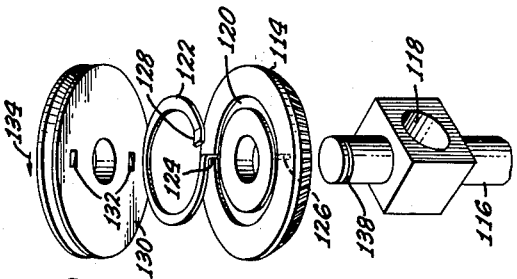
WAYLAND H. CRAWFORD,
INVENTOR.
BY
ATTORNEY.

March 31, 1964  W. H. CRAWFORD  3,126,981
CHECK STAND
Filed Dec. 17, 1959  6 Sheets-Sheet 4
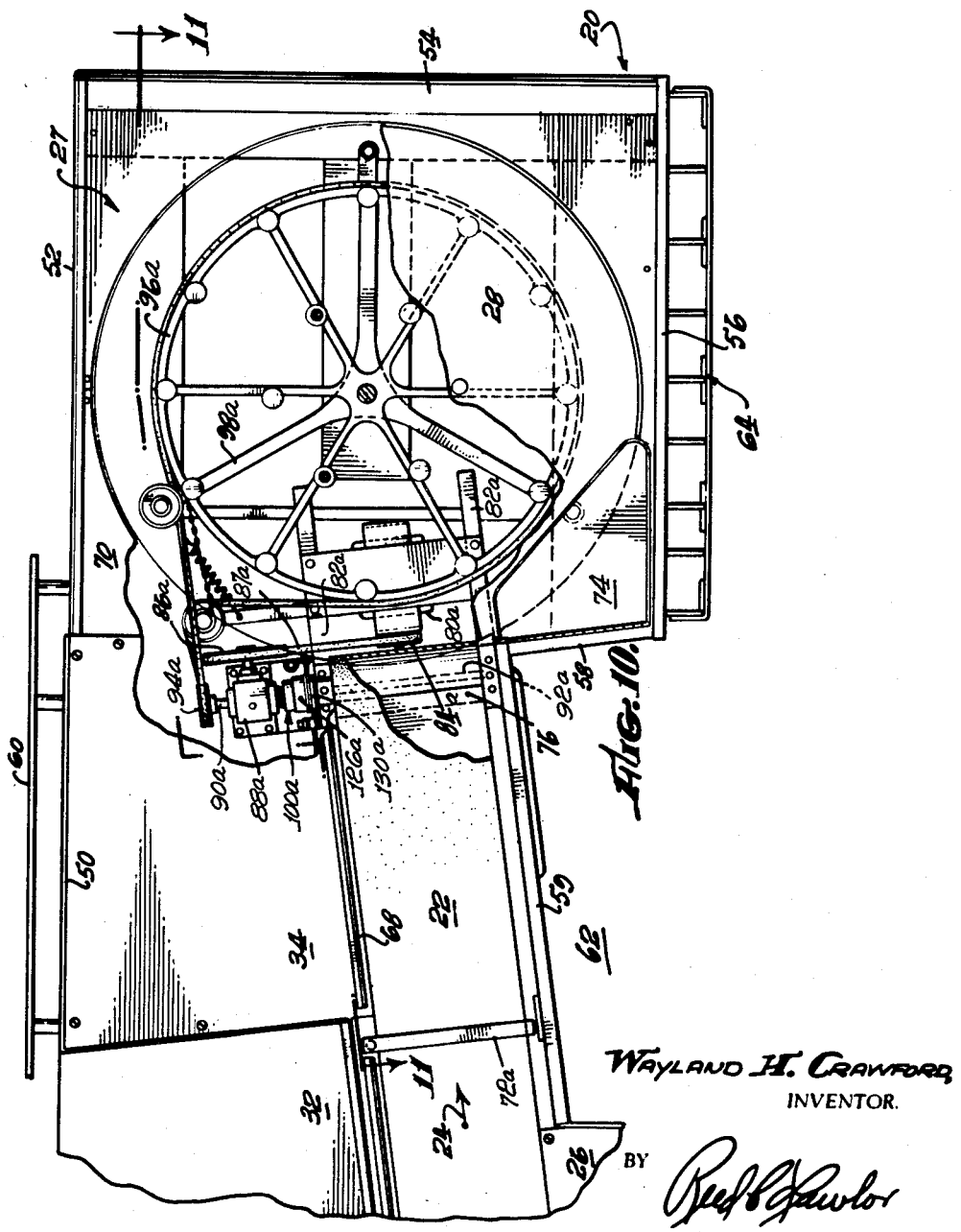
WAYLAND H. CRAWFORD
INVENTOR.
BY
ATTORNEY.

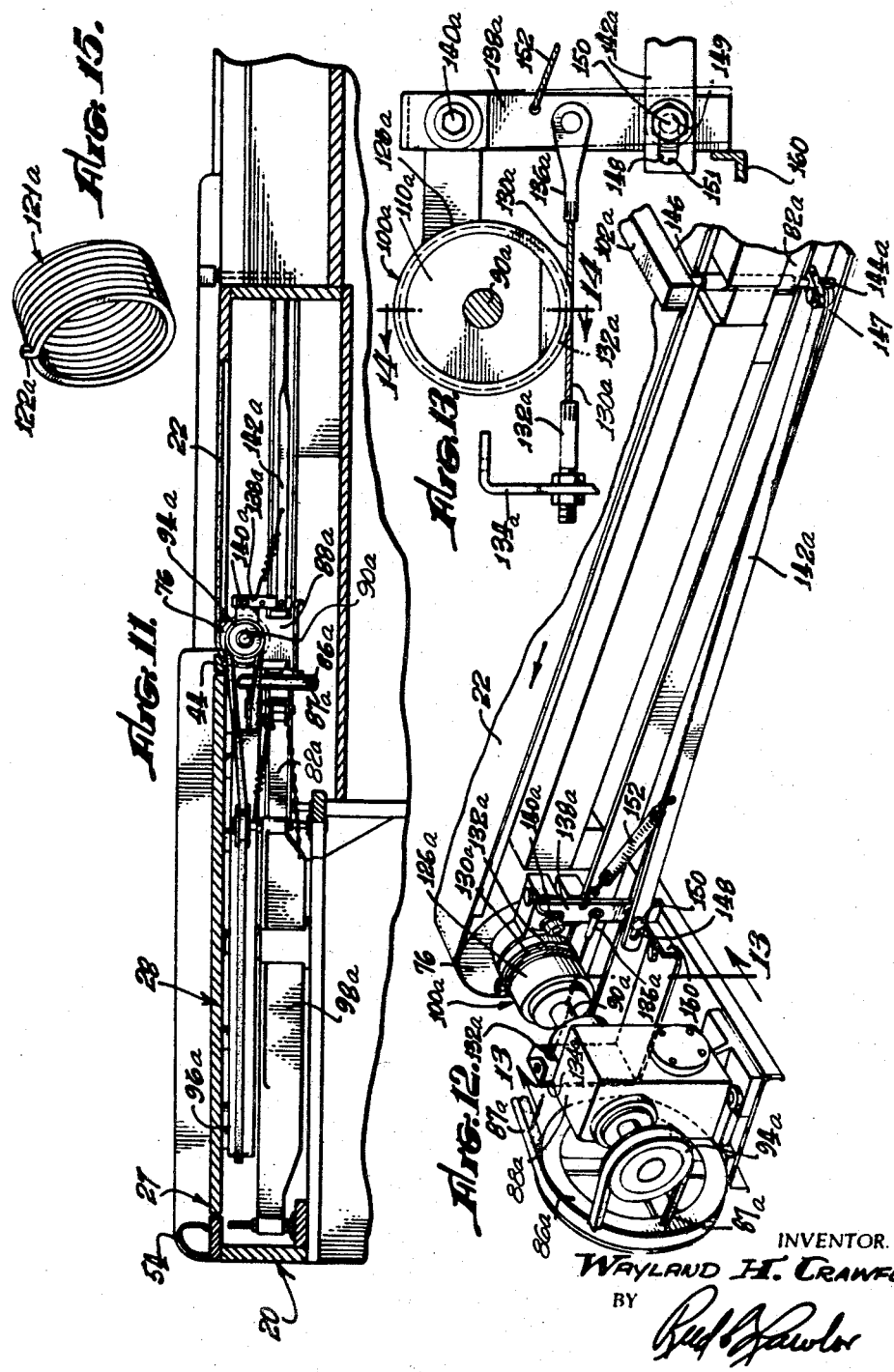

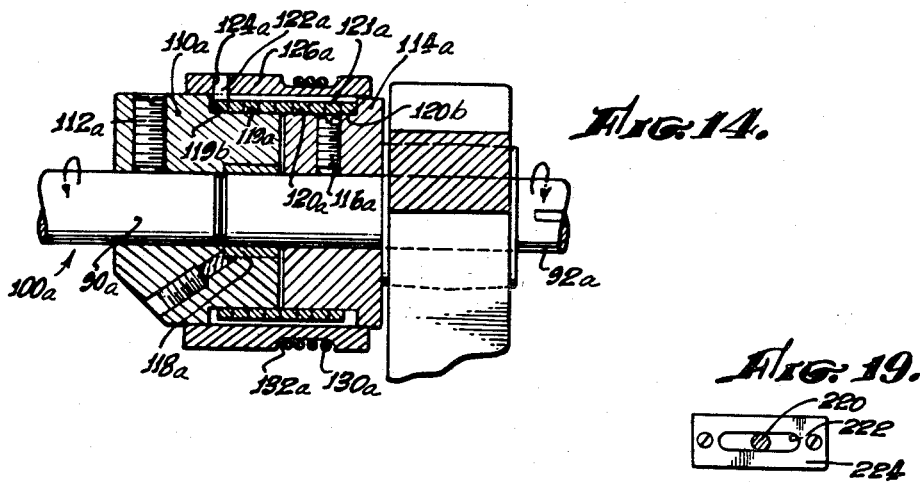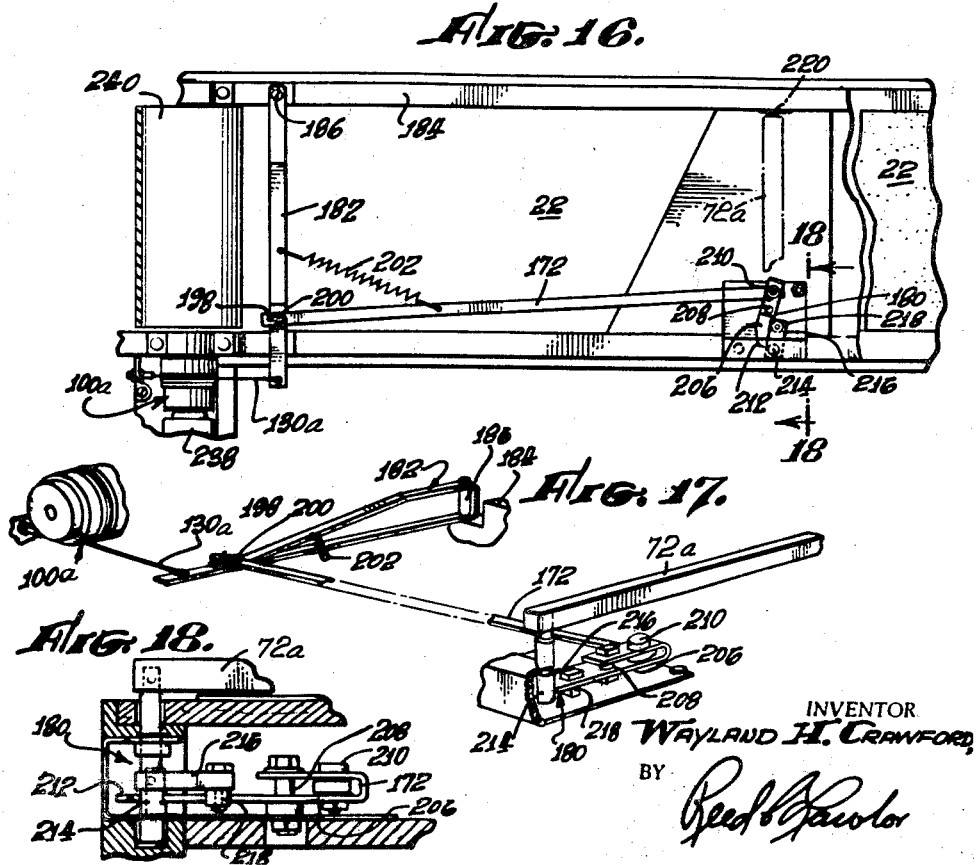

United States Patent Office 3,126,981
Patented Mar. 31, 1964

3,126,981
CHECK STAND
Wayland H. Crawford, San Gabriel, Calif., assignor to Modern Village Stores, Inc., El Monte, Calif., a corporation of California
Filed Dec. 17, 1959, Ser. No. 860,292
10 Claims. (Cl. 186—1)

My invention relates generally to improvements in check stands that are employed for checking out customers in retail stores, such as grocery stores, and more particularly to an improved check stand of the type that employs a conveyor.

In many grocery stores it is customary for the customer to select his meats and groceries and then cart them in suitable carriages to a checking-out point where a checker, or cashier, checks and tallies the items purchased and then determines the total sales price to be paid. This method of merchandising has been extended to other types of retail stores, such as drug, hardware, gardening, feed, and other similar stores. From a competitive viewpoint, it is highly desirable to perform the checking-out operation rapidly, accurately, and with a minimum of expense.

In check stands that are now in widespread use, conveyor belt means are employed to feed a succession of items to be checked from an unloading position to a sacking position. The checking is done at a checking position which is usually situated at a location intermediate the unloading and sacking positions. The customer, or in some cases the checker, removes the selected items from the carriage and places them on the conveyor belt means, which transports the items to the checking position. In my invention, after the purchases are checked by the checker, or cashier, they are then released for further transport on the conveyor belt means to a rotary sacking platform. At this point, the sacker then places the items in suitable bags, boxes, or other containers.

In such check stands that are now in use, the conveyor belt means unloads the items onto a stationary platform. This type of unloading often leads to congestion of the items at the end of the conveyor belt means with consequent tumbling of the items so unloaded and possible breakage of the glass-enclosed articles. Such congestion leads to unwarranted delays in sacking. Such delays in servicing many customers throughout a day's operation represents a deficiency which has heretofore been accepted as unavoidable.

It is an object of my invention, therefore, to provide an improved check stand that provides for rapid servicing of customers with a minimum effort to the checker and sacker so that a maximum number of customers may be serviced in a day's operation.

Another object of my invention is to provide a check stand with a conveyor belt means feeding onto a rotary sacking platform whereby the necessary congestion at the end of the conveyor belt means is avoided.

A further object of my invention is to provide an improved compact check stand with conveyor belt and rotary sacking platform means for rapid servicing of customers by the checker alone.

A still further object is to provide a drive system wherein movement of the conveyor belt may be stopped by action of goods thereon, the rotary platform, however, remaining movable, manually or otherwise, following stoppage of the belt. An additional object is to provide for continued rotation of the rotary platform by the drive system following stoppage of belt movement.

Another object of my invention is to provide weighing scales and cash register platforms so located with respect to the conveyor belt means and the checking position as to promote compactness in my improved check stand.

According to the present invention, entirely mechanical means are provided for automatically stopping the conveyor belt means when an item to be checked does not receive the required attention from the checker. More particularly, in the present invention a mechanical arrangement is provided for stopping the conveyor belt means when an item is carried by the conveyor belt means to a predetermined point at the checking station, but without stopping the rotation of the rotary table.

The advantages of the present invention over prior systems are several. In the present system, the stopping of the conveyor belt means is accomplished in a purely mechanical way by impingement of an item on a stop-bar that extends across the conveyor belt means. In this way, the necessity for including auxiliary electrical equipment for achieving this result is avoided. Furthermore, by providing purely mechanical means for accomplishing this purpose, such means may be readily incorporated in a driving system which permits a motor to continue to rotate the rotary table even though the conveyor belt means has been stopped. A further advantage of the present invention resides in the fact that by the employment of purely mechanical means of this kind, it becomes unnecessary to repeatedly stop and start the driving motor which supplies the power that moves the conveyor belt, thus making it possible for the motor to run continuously. Overheating that might otherwise arise because of the repeated and frequent application of starting current to the motor, is eliminated. At the same time, by employing a purely mechanical control, the necessity for employing solenoid clutches is eliminated.

The foregoing and other advantages and features of my invention will be apparent from the following description of my improved checkstand. Although only certain embodiments of my present invention are described herein in detail, it will be understood that my invention is not limited thereto but that it may be embodied in many other forms within the scope of the appended claims.

This application is a continuation-in-part of my prior applications Serial No. 638,576 filed February 6, 1957 and Serial No. 746,918 filed July 7, 1958, both of which now stand abandoned in favor of the present application.

In the drawings, wherein like reference characters denote like parts throughout the several views:

FIGURES 1, 2, and 3 are respectively top plan, elevational front, and side elevational views of my improved check stand;

FIG. 4 is a partial cross-sectional view from the front, showing the motor and conveyor belt drive;

FIG. 5 is a partial cross-sectional view taken on the line 5—5 of FIG. 4;

FIG. 6 is a partial cross-sectional view showing the geared rotating platform drive as taken on the line 6—6 of FIG. 7;

FIG. 7 is a partial cross-sectional elevation showing the rotating platform and its driving elements;

FIG. 8 is a partial top cross-sectional plan of the parts shown in FIG. 7;

FIG. 9 is an exploded view of the one-way clutch embodied in the rotating platform drive;

FIGURE 10 is a fragmentary cross-sectional view of a modified form of the invention from the top showing the conveyor belt means, the rotary table, and the mechanism for driving them;

FIGURE 11 is a fragmentary cross-sectional view taken on the line 11—11 of FIGURE 10, and showing part of the driving mechanism;

FIGURE 12 is a fragmentary isometric view of a part of the driving system;

FIGURE 13 is a detailed view of the control mechanism taken on the line 13—13 of FIGURE 12;

FIGURE 14 is a cross-sectional view taken on the line 14—14 of FIGURE 13;

FIGURE 15 is a perspective view of the clutch spring;

FIGURE 16 is a fragmentary top plan view of another embodiment of my improved checkstand;

FIGURE 17 is an exploded fragmentary view, showing details of the linkage of the embodiment of FIGURE 16;

FIGURE 18 is a cross-sectional view taken on the line 18—18 of FIGURE 16; and

FIGURE 19 is a detail view of the stop bar limit mechanism.

Referring to the drawings, the improved check stand of FIGS. 1 to 9, which in FIGS. 1, 2 and 3 is designated 20, is generally rectangular in configuration, as shown, and employs a single conveyor belt 22 to transport a plurality of articles in the direction of the arrow 24 from an unloading or sorting platform 26 to a rotary sacking platform 28. The sorting platform 26 may be used to assemble multiple priced items before placing them on the conveyor belt and also may be used as a convenience area for the customer's purse or other personal objects. Platforms 30, 32, 34, and 36, respectively, are provided to furnish bases for a display stand (not shown), a weighing scale 38, a cash register 40, and additional sacking spaces adjacent the rotating platform 28. Platform segments 42 and 44 are located at the supply and delivery ends, respectively, of the conveyor belt 22. Platforms 26, 30, 32, 34, and 36, rotary sacking platform 28, the upper horizontal surface of conveyor belt 22, and platform segments 42 and 44 constitute a substantially horizontal planar surface on which all loading, transporting, checking, and sacking operations may be readily performed. Guard members 46, 48, 50, 52, 54, 56, 58, and 59 are mounted around the entire horizontal surface of the check stand and, by projecting vertically and upwardly therefrom various convenient heights of, say, three-fourths to three inches, serve to prevent the various items being handled from falling off the stand. Guard member 60 is mounted outwardly from the stand and provides means to protect the stand from being marred by the service carriages used to transport the purchases from the shelves to the check stand.

The various general constructional features of the base of the check stand are similar to those shown in my Patent No. 2,723,728 and will not be further described herein, and the angular disposition of the conveyor belt 22 is similar to that described and claimed in my Patent No. 2,776,730.

Niche 62 is formed in the front of the check stand intermediate its ends and opposite the cash register and weighing scale, and provides space for a checking position for the cashier. Bag rack 64 is located on the front of the check stand adjacent the checking position. As will be more fully described hereinafter, the convenient locaton of this bag rack 64 facilitates the servicing of customers when the checking and sacking are done by one person. Another facility for this purpose is found in the retractable shelf 66 which may be pulled out by the checker for resting sacks or boxes being filled with articles taken from the rotating platform 28. Guard rail 68, which is secured to and extends upwardly from cash register platform 34 in front of the cash register 40, is supplied for the protection of the cash register. The guard rail 68 and guard member 59 form boundaries of a path for the stream of articles being transported by the conveyor belt 22 from the sorting platform 26 to the rotary sacking platform 28. The vertical extension of this guard rail 68 is so dimensioned as not to interfere with the opening and closing of the cash register cash drawer.

A raised triangular deflector segment 70 is secured with screws or other suitable fastening means to the surface of the check stand and serves the dual purpose of providing a lateral stop for the cash register and acting as a deflector for items being transferred from the conveyor belt to the rotary sacking platform 28. This deflector segment 70 may be of any convenient height or thickness but is usually constructed of one-inch material. If this deflector were not present, the effect caused by the transition from the forward linear motion engendered by the conveyor belt to the rotary motion of the rotary sacking platform would be to slide articles off the rotary platform and into that corner adjacent the cash register, where they would be relatively inaccessible to either the checker or the sacker. This deflector 70 thus causes the articles to remain on the rotating platform. Once the items are located on the rotary sacking platform by the deflector 70, there is little further tendency on their part to escape therefrom.

Guard rail 68 is curved at both ends. The curved end 67 of guard rail 68, located in the sorting platform direction, conveniently serves as a stop for cross-arm 72. Other forms of stops limiting the travel of the free end of cross-arm 72 may be provided as found desirable. At the rotary sacking platform end, the curvature 69 of guard rail 68 blends into the curvature of the deflector segment 70 so that there will be no obstruction to the smooth flow of articles being transported by the conveyor belt onto the rotary sacking platform.

A hinged deflector segment 74, which is supported by guard member 58 and extends a varying distance over the edge of the peripheral surface of the rotary sacking platform 28, as shown at 75 in FIG. 1, renders a very unique and useful service. As the articles come off the conveyor belt 22 and pass to the rotary sacking platform 28, they tend to remain near the periphery of the rotating platform after being deflected thereon by the first deflector 70. As the articles come on around, however, they impinge on the second deflector 74, which forces them gently in a generally radial or spiral direction toward the center of the rotating platform. This additional deflection thus keeps the space on the rotary sacking platform adjacent the delivery end of the conveyor belt free to receive further articles from the belt. Without this arrangement, a congestion of items occurs when the peripheral space on the rotating platform becomes fully occupied. Sometimes, the second deflector segment 74 causes the various concentric or spirally concentric rows of articles to continuously nudge themselves inwardly until the whole rotating platform is covered with items, the space at the delivery end of the conveyor belt remaining free and vacant until the rotary sacking platform is completely filled. Deflector segment 74 is hinged to allow flat articles, such as packages of bacon and prepared soups, to pass under it without damage to the package. Customers' change also may be placed on the upper surface of this segment. It should be noted that projection 71 on deflector 74 which lies adjacent the front of the check stand extends only to the edge of the rotating platform 28 or only slightly thereover, whereas projection 65 on this deflector 74 adjacent the delivery end of the conveyor belt extends well over the edge of the rotating platform, say three inches. The edge 75 may be a straight line, as shown. This edge intersects the circumference of the rotary sacking platform at the leading edge thereof and is perpendicular to an intersecting radius of the rotary platform.

In order to further promote the easy transition of the items carried by the conveyor belt to the rotary sacking platform, platform segment 44 is removably located at the delivery end of the conveyor belt 22. As shown in FIG. 7, this segment 44 is provided with a belt-conforming lip 45 which is shaped to conform to the shape of the belt 22 as it passes over the idler drum pulley 76 and is also horizontally curved as at 77 (FIG. 1) so as to fit close to the circumferential edge of the rotating platform 28. This platform segment 44 rests loosely on adjusting screws 78 and is so arranged that if any flat article carried by the belt, such as certain types of packaged soups or bacon, should follow the belt around and catch under the belt-conforming lip of this part, the segment 44 would flip up out of the way and thus prevent the conveyor belt from being jammed with consequent possible injury to the belt, to the driving motor, and to the power transmission means. In use, this platform segment 44 is levelled on its adjusting screws 78 so that it rests with its upper surface just below the common plane of the belt and the rotary sacking platform, say 1/32 of an inch. This latter adjustment promotes the facile flow of the articles being transported from the delivery end of the conveyor belt to the rotating platform.

Referring to FIGS. 4, 5, and 7, conveyor belt 22 is carried on drum pulleys 76 and 80, which in turn are rotatably supported on frame members 82. Lateral adjustment members 84 are provided in conjunction with the bearing supports of driving drum pulley 80 so as to adjust the tension of the belt. Driving drum pulley 80 is supported on shaft 81, which is coupled by means of a flexible coupling 86 to the output shaft 88 of speed-reducing gear box 90. The input shaft 92 of this gear box 90 carries a pulley 94 which is connected by a suitable belt to the smaller pulley 96 on the shaft of ventilated driving motor 98. The motor is adjustably suspended from the frame members 82. These frame members 82 are adjustably supported from the framework of the stand by level-adjusting bolts 100, so that the entire belt conveyor unit can be levelled to conform to the general horizontal plane established by the various check stand top platforms, including the rotary sacking platform.

With reference particularly to FIGS. 6–8 inclusive, rotary sacking platform 28 is supported by turntable wheel 102 to which it may be secured as by countersunk machine screws in the recesses 104 provided therein. Turntable wheel 102 is rotatably supported in turntable base 106, which in turn is supported by the framework of the check stand. Levelling bolts 108 are required so that rotary sacking platform 28 may be levelled to conform to the generally horizontal planar top of the check stand.

Driven drum pulley 76 is supported in its bearings by elongated shaft 110 to which is pinned or otherwise secured bevel gear 112. A meshing bevel gear 114 is rotatably supported at the upper end of adjustable supporting post 116 which carries an enlarged bored portion 118. This bored portion furnishes additional support for the elongated shaft 110. Bevel gear 114 is provided with an annular groove 120 to accommodate a clutch spring 122. Thus clutch spring is cut and has one end turned down sharply at ninety degrees (90°) to form a nib 124. This nib 124 fits into a recess 126 which is machined at the bottom of groove 120. The other end of clutch spring 122 is turned up at an oblique angle 128 and protrudes slightly above the surface of the gear 114. Rotary sacking platform driving pulley 130 is furnished with two or more angular abutments or clutch teeth 132 on its lower surface which, when meshing with the upturned end 128 of clutch spring 122, prevent the pulley 130 from turning in a direction opposite to that indicated by the arrow 134. It will be appreciated that this arrangement of the bevel gear 114, clutch spring 122, and pulley 130 constitutes a one-way or free-wheeling clutch for the purposes hereinafter described. As shown in FIG. 6, the foregoing parts are rotatably held on post 116 by a spring washer 136 fitting into groove 138 machined in the upper end thereof. Rotary sacking platform drive pulley 130 is connected by a shiftable V-belt 140 to the turntable wheel 102, and adjustable idler 142 is arranged to take up the slack in the belt 140 as may be required.

To further facilitate the checking operation, pivoted cross-arm 72, as more fully described in my Patent No. 2,723,728, is connected to a micro-switch 73 which is included in the electric circuit supplying requisite current and voltage to the driving motor 98. This micro-switch 73 is of a normally closed type. With this arrangement, if an item to be checked is not lifted by the checker in time from the moving surface of the conveyor belt, it will impinge upon the cross-arm 72 and force it in the direction of belt travel. As this arm so moves to the right, it opens the micro-switch and then is prevented from further movement to the right by the stop furnished by the adjacent end 67 of the guard rail 68. The opening of the micro-switch interrupts the current to the motor, whereupon the motor, conveyor belt, and rotating platform all come to rest. Further power-driven motion can occur only after the article impinging upon the cross-arm 72 is removed and the cross-arm is allowed to return to its normal position, thus closing the micro-switch 73. In other words, if the checker does not interrupt the flow of goods on the conveyor belt before they reach the cross-arm 72 by lifting the items clear of the belt and cross-arm, performing the checking and tallying operation, and replacing them on the conveyor belt downstream of the cross-arm 72, the flow of items will be uninterrupted until one or more of them impinge upon the cross-arm and thus actuate the control for stopping the conveyor belt and its associated rotary sacking platform. Thus, interrupted flow can be defined as that flow of items which, due to checker interference, does not actuate the stopping control, whereas uninterrupted flow can be defined as that flow of items which, due to the failure of the checker to properly interfere, causes the items on the conveyor belt to actuate the stopping control.

It should be noted from the foregoing that when the cross-arm 72 is against the stop furnished by the end 67 of guard rail 68, the cross-arm effectively prevents any article being conveyed by the conveyor belt 22 from impinging upon or hitting against the cash register drawer when it is extended. This barrier will exist even though the micro-switch actuated by arm 72 fails to operate. It should also be further noted that this positioning of the cash register with the ability to extend the open cash drawer across the conveyor belt to a position within easy reach of the checker not only promotes but is indicative of the compactness of my improved check stand.

With the check stand in operation and the cashier attending, the customer with a loaded carriage approaches and stops adjacent the sorting platform. The customer, or the cashier, or both, remove the selected items from the carriage and place them on the sorting platform 26 or directly on the conveyor belt. These items are then carried by the conveyor belt to the checking position. The cashier rings them up with one hand, while lifting the items over the cross-arm 72 with the other. The items proceed with the conveyor belt and are transferred to the rotary sacking platform as previously described. Under normal condition, this procedure results in a steady flow of items being transported by the conveyor belt from the sorting platform to the rotary sacking platform. If the selected items are arriving too fast, one or more of them will impinge upon the cross-arm 72 and thus stop the conveyor belt as previously described. The conveyor belt will remain stopped until the checker has lifted the last item impinging upon the cross-arm 72. The cross-arm is then free to move to the left and, by closing its associated micro-switch, starts up the conveyor belt in its normal operation.

The sacker usually stands at the end of the check stand and picks the items off the rotating platform as they come within easy reach. Retractable shelves 144 are provided for the sacker's convenient use in holding the boxes or bags being filled. At the completion of the checking for one customer, the sale is rung up and the cash drawer opens across the conveyor belt.

In the event another customer had approached unnoticed and started to unload her selected items onto the conveyor belt, the first item or items to reach it would actuate the cross-arm 72 and cause the conveyor belt and the rotating platform to cease their respective motions. Under this condition, the sacker or checker, depending upon which one was doing the sacking, could then rotate the table manually in a clockwise direction and thus complete the packaging operation without having to reach across the otherwise now-stationary platform. It can easily be seen that this ability to rotate the sacking platform manually would be of the greatest assistance to the checker or cashier when only one person is operating the check stand.

Upon completion of the servicing of the first customer, the cash drawer is closed, and the items impinging upon the cross-arm 72 are rung up on the cash register and deposited downstream on the other side of the cross-arm. As soon as the cross-arm returns to its normal position, the motor starts and the check stand is again in full operation.

The convenient location of the weighing scale 38 to the left of the cash register 40 enables the customer to place the items to be weighed directly on the scale pan, from which they can be easily removed by the checker with a minimum of effort.

Other advantages of this improved check stand can be found in that, with the customer approaching and passing on the same side as the cashier's location, or checking position, the customer can clearly see each operation of weighing and checking and is stimulated to assist the checker in the unloading of the carriage. Further, the cashier can keep the empty carriages flowing out of the way into the carriage lane, where they are within fingertip reach of the checker or sacker for carry-out purposes.

It will be clear from the foregoing that I have provided an extremely compact and improved form of check stand which expedites the checking out of customers. The positioning of its various parts and appurtenances, including the sorting platform, weighing scale, cash register, and rotary sacking platform, within an easy arm's reach of the checker, facilitates efficient one-person operation, thus materially reducing the cost of this necessary customer check-out.

Although my invention has been above described with reference to this specific embodiment thereof, it will be obvious that many changes may be made in the material, form, details of construction, and arrangement of the elements without departing from the spirit of my invention. For instance, while a pivoted cross-arm actuating a microswitch after impingement of an article thereagainst is shown as being used to control the driving motor, it will be understood that many other devices may be employed for this purpose, such as a pressure switch under the belt or a photo-electric relay actuated by a beam of light traversing the conveyor belt, all as is now well known to those skilled in the art. Furthermore, although the rotary sacking platform is shown as being operated by a gearing, belt, and pulley arrangement originating with the conveyor belt-driven drum pulley, it should be understood that other forms of power transmission from the driving motor could be utilized, such as, for example, friction drive to the rotating platform instead of the belt and pulley; belt and pulley drive from the conveyor belt driving drum pulley; gearing or direct belt and pulley drive from the gear box; and/or direct belt and pulley drive from the motor with suitable guides.

As indicated in FIGURES 10, 11 and 12, which show another embodiment of the invention, a single motor 80a, firmly secured to the frame members 82a, which also support the respective pulley 76, is employed for driving both the rotary table 28 and the conveyor belt means. The motor itself is energized from an electric power circuit by means of an electric switch mounted on the checkstand in a wall portion forming part of the niche 62. A driving pulley 84a keyed to the output shaft of the motor 80a, serves to drive an intermediate driven pulley 86a by means of a V-belt 87a. The driven pulley 86a serves as a drive for a speed reducing gear box 88a having a double ended output shaft 90a. This shaft 90a is coaxial with a shaft 92a upon which the belt-driving pulley 76 is mounted and keyed. A sheave 94a at the outer end of the shaft 90a drives a V-belt which engages a turntable wheel 96a which supports the rotary table 28 and which is rotatably supported on a turntable base 98a.

In the form of FIGS. 4 to 9, the shaft parts corresponding to the parts of a single shaft, and the motor 98 is connected directly to the pulley at the other end of the V-belt, but in this form the motor is not only moved to the location shown in FIGURE 10, but a mechanically operated clutch 100a is connected between the shaft 90a and the shaft 92a so as to permit stopping the carrier belt 22 under certain conditions without, however, requiring that the rotary table 28 be stopped.

In the improved checkstand shown in FIGURES 1 and 10 to 15, a stop bar 72a, corresponding with stop bar 72, is pivotally mounted on the frame 82a and normally extends transversely of and across the conveyor belt 22 for detecting an item which arrives at the checking position without receiving the checker's attention, and this stop-bar is mechanically connected to the clutch 100a by means of a mechanical linkage for disengaging the clutch to stop the conveyor belt 22 without stopping the rotary table 28. With this arrangement, a flow of items to the checking position is stopped automatically when an item that has not been properly checked impinges upon the stop-bar 72a. Devices for automatically stopping the movement of the belt in response to actuation by an item are illustrated, described and claimed in my Patent No. 2,723,728, which issued November 15, 1955.

As shown in more detail in FIGURE 14, the clutch 100a is of the overrunning spring-energized type. The clutch includes a driving member 110a in the form of a collar or large bushing or wheel, secured to the inner end of the jack-shaft 90a by means of a keying set screw 114a in the form of a collar or large bushing or wheel, secured to the outer end of the pulley shaft 92a by means of a keying set screw 116a. The outermost end of the pulley shaft 92a extends into a bearing 118a at the adjacent end of the driving collar member 110a to facilitate alignment of the shafts 90a and 92a. The two collars 110a and 114a are provided with cylindrical outer surfaces 119a and 120a of circular cross-section and of the same diameter, forming a split, or divided, annular recess between corresponding shoulders 119b and 120b.

The two collar members 110a and 114a are coupled by means of a helical spring 121a formed of wire of rectangular cross-section, as shown in FIGURE 15. The successive turns of the wire are laid flat upon the two cylindrical surfaces 119a and 120a. The outer end of the spring 121a remote from the pulley lies on the driving member 110a. This end is provided with a radially projecting nib 122a which projects radially outwardly into an aperture 124a in a collar or sleeve 126a which slidably encircles the two clutch members 110a and 114a.

The spring 121a, which spirals in a clockwise or right-hand direction, is so dimensioned that when the nib 124a is not constrained against rotation, the spring fits snugly against the two cylindrical surfaces 119a and 120a. With this arrangement, rotation of the driving shaft 90a in a counter-clockwise, or left-hand, direction, as viewed from the reducing gear 88a, causes the pulley shaft 92a to rotate at the same speed in a counter-clockwise direction. Thus, the clutch is self-energizing, when the clutch is engaged, in that such rotation causes the spring to be tightened on the clutch members 110a and 114a.

To disengage the spring 121a, and thus disengage the clutch, mechanical means connected to the arm 72a is employed to lock the collar 126a in place at any position in its rotation. For this purpose, a flexible metal cable 130a is helically wound in a circular groove 132a on the outer side of the collar 126a, as shown, for example, in FIGURE 13. One end 132a of the cable is firmly attached to a bracket 134a fixed to the frame 82a. The other end 136a of the cable is attached to a pivot arm 138a. The pivot arm 138a is pivotally mounted on a suitable pivot pin 140a located at its upper end and rigidly mounted relative to the frame 82a. An elongated horizontal link 142a provides a connection between the lower movable end of the link 138a and a crank 144a rigidly secured to the lower end of the pivot shaft 146 upon which the stop-bar 72a is mounted. The link 142a is in the form of a metal strap which is twisted to facilitate attachment by means of a pivot pin 147 to the crank 144a and is provided with a slot 148 through which projects a link pin 150 that is fixed to the lower end of the link 138a. A normally extended coil spring 152 is interconnected between the two links 138a and 142a to facilitate swinging the bar rearwardly to its upstream position.

With this construction, when the cable 30 is tightened on the collar 126a, the rotary movement of the collar is retarded and quickly halted. As a result, the pressure exerted by the collar on the nib 124a relieves the pressure of the spring 121a on the cylindrical surface 119a of the driving member 110a, permitting the driving member 110a to rotate freely within the helical spring 121a, even though the rotation of the helical spring has been stopped. But when pressure on the nib 124a is released, the spring 121a contracts and thus engages the cylindrical surface 119, permitting the driving member 110a again to transfer motion to the driven member 114a. The cable 130a is operated by the stop-bar 72a by means of the linkage described below.

The coil spring 152 is connected to the link 142a at a position thereon between the stop-bar 142a and the link pin 150 that is located at the end of the pivot arm 138a. The coil spring is also connected to the pivot arm 138a between the link pin 150 and the pivot pin 140a. By virtue of this arrangement, the coil spring 152 performs several functions, because it tends to draw the two links 138a and 132a together into alignment in a scissor-like type of action.

Normally, while the conveyor belt is moving and no article is impinging the stop-bar 72a, the coil spring 152 draws the horizontal link 142a towards the downstream position and presses the upstream end 149 of the slot 148 into engagement with the link pin 150. Simultaneously, the pivot arm 138a is urged against a stop 160, which limits the swinging movement of the pivot arm 138a toward the clutch. Under these circumstances, the stop-bar 72a is drawn into its normal position transverse to the path of movement of articles being carried by the conveyor belt. The various elements are so proportioned that in their normal position, the stop bar 72a extends substantially normally across the conveyor belt 22.

It is to be noted, however, that the slot 148 permits the horizontal link 142a to be drawn rearwardly against the force of the spring 152, even when the cable 130a is in its active position drawn taut about the cylinder 126a. With this arrangement, when an article impinges the stop-bar 72a, the shock of the article striking the stop-bar is absorbed by the spring 152. As the stop-bar swings forwardly toward its downstream position, the forward end 151 of the slot 148 engages the link pin 150, drawing the arm 142a rearwardly and causing the cable 132a to grab the collar or sleeve 126a, thereby disengaging the clutch 100a and permitting the conveyor belt 22 to decelerate to a stop.

With the checkstand in operation and the cashier in attendance, a customer having a loaded carriage approaches the unloading counter 26, 30 and there places items to be purchased on the unloading counter and then onto the upstream end of the belt 22. As the items are carried by the conveyor belt to the checking station, the cashier picks them up, one at a time, with one hand, lifting the items over the cross-arm 72a with the other. As the items are placed on the belt 22 on the downstream side of the cross-arm 72a, they are carried to the rotary sacking platform 28, from which they are then removed to be placed in sacks, boxes, and the like, either by the cashier, the customer, or a sacker. If the selected items are arriving at the checking station too fast, one or more of them impinges upon the cross-arm 72a, swinging the arm 72a in a downstream direction, thus pulling on the link 142a and swinging the pivoted link 138a away from the clutch 100a, thereby increasing the tension of the cable 130a on the collar 126a. As the collar 126a is retarded and stopped by the cable 130a, the spring 121a becomes de-energized, causing the clutch to disengage and thus permitting the conveyor belt 22 to decelerate to a stopped condition. However, while the clutch 100a is thus disengaged, and the conveyor belt 22 is stopped, the motor 80 continues to operate and to drive the rotary table 28. When the item that has impinged upon the cross-arm 72a is subsequently picked up by the checker, the tension on the cable 130a is relieved, thus permitting the spring to be energized and to cause the clutch to be engaged, thus driving the conveyor belt again.

When the conveyor belt 22 is thus stopped intermittently by impingement of items on the cross-bar 72a, the rotary table 28 continues to rotate. By virtue of this fact, the energy and time required to re-start the motor when the impinging item is lifted over the cross-arm 72a, is eliminated. Furthermore, by virtue of the fact that the rotary table 28 continues to rotate, even when the conveyor belt 22 stops, the advantageous use of the rotary table in aiding the sacker in performing his task of sorting and sacking, is preserved.

In FIGURES 16, 17 and 18, a further improvement of this invention is illustrated. This improvement employs a different form of linkage for communicating movement of the cross-arm 72a to cable 130a. This linkage lies substantially entirely in the space between the edges of the conveyor belt 22. More particularly, this linkage employs a reversing linkage 180 mounted directly beneath the cross-bar 72a and in the space between the edges of the conveyor belt. In addition, a horizontally extending arm 172 extends from the reversing linkage 180 to a point near the driving drum 240 at the downstream end of the conveyor belt. At this point, the arm 172 engages a cross-arm 182 that extends in a direction transverse to the length of the conveyor belt 22. The two ends of the arm 182 extend slightly beyond the edges of the belt. The free end of arm 182 is connected to the cable 130a. The other end, however, is pivotally attached to a frame member 184 of the check-stand by means of a pivot pin 186.

The downstream end of the arm 172 is provided with a slot 198 that engages a link pin 200 to communicate forces between the arm 172 and the cable 130a, and a normally extended tension spring 202 interconnects the link arm 172 and the pivot arm 182 to cushion certain shocks, somewhat as in the embodiment of the invention described next above.

As shown in more detail in FIGURES 11 and 12, reversing linkage 180 includes a lever 206, which is pivotally mounted on a pivot pin 208, located between its ends. One end of the lever is provided with a link pin 210, which provides a connection between the lever 206 and the arm 172. The other end 212 extends beyond the edge of the belt to a point beyond the pivot shaft 214 to which the cross-arm 72a is securely fastened. With this arrangement, normally the spring 202 tends to draw the link arm 172 and the pivot arm 182 together in a scissor-like manner, thus rotating the lever 206 counter-clockwise and pressing the end 212 firmly against the pivot shaft 216, which thus acts as a stop. A crank 214, securely fastened to the pivot shaft 214, extends therefrom in a direction parallel to the cross-arm 72a. A drive roller 218 is mounted directly beneath the outer end of the crank arm 216 and in the plane of the lever 206.

With this arrangement, when an article being carried by the conveyor belt impinges the stop-bar 72a, the crank 216 is swung counterclockwise, thereby moving the lever 206 counter-clockwise and drawing the cable 130a taut about the clutch sleeve 132a, causing the conveyor belt to stop. When the article that impinged upon the conveyor belt is removed, the spring 202 causes the pivot arm 182 to swing toward the clutch 100a, thereby releasing the cable 130a. Simultaneously, the spring pulls the link arm 172 in a downstream direction, rotating the lever 206 toward its normal position where the end 212 engages the pivot shaft 214.

In the swinging action of the lever 206, the crank 216, and hence also the cross-arm, are restored to their normal positions. The range of movement of the stop bar 72a is determined by a pin 220 carried at its end and movable in a slot 222 of a plate 224 fixedly mounted on the checkstand.

It is to be noted that this embodiment of the invention provides an arrangement in which very little of the clutch-operating linkage lies beyond the edges of the conveyor belt. In fact, it will be noted that almost the entire space between the roller 240 and the lever arm is free of any projecting obstructions. Consequently, the operating linkage of the second embodiment of the invention is superior to that first described above, because of the fact that the conveyor belt may be placed closer to the well 32 in which the scale 38 is mounted, thus making the entire unit more compact.

While I have described embodiments of my invention which employ specific forms for different parts thereof which are now deemed to be best by me, it is to be understood that the invention may be embodied in other forms without departing from the principles of the invention. It will therefore be obvious that many changes other than previously mentioned may be made in the material form, details of construction and arrangement of the elements without departing from the invention and that the invention is not limited to the specific embodiments thereof, illustrated and described herein, but that the invention encompasses all embodiments thereof that fall within the scope of the claims.

I claim:

1. A check stand having stationary top surface portions including a generally horizontal top area and providing a loading end and a delivery end, said top area having a circular recess adjacent said delivery end and a longitudinal recess extending between said loading end and said circular recess;
   a rotary sacking platform mounted in said circular recess;
   a longitudinal conveyor belt mounted in said longitudinal recess and having one end disposed adjacent said rotary platform to feed articles along a longitudinal path toward said rotary platform, the uppermost surfaces of said platform and belt being substantially coplanar with one another and with the stationary top surface portions of said check stand;
   said stationary top surface portions of said check stand including a segment disposed between said belt and said rotary platform;
   means defining a checking position between said loading and delivery ends and adjacent said belt; and
   means extending across said path adjacent said checking position for impeding the feeding of articles.

2. The combination of claim 1, wherein said check stand includes a stationary platform adjacent said longitudinal belt on the opposite side thereof from said checking position and having a cash register mounted thereon, said cash register having a cash drawer that is, when closed, withdrawn from the path of said conveyor belt means but which is, when opened, located above and at least partially across said conveyor belt means.

3. In a check stand,
   a substantially horizontal planar top surface providing a sorting section at one end and a sacking section at the other end, said top surface having a circular recess in said sacking section and a longitudinal recess extending from said sorting section to a point adjacent said sacking section;
   means defining a checking position between the two ends of said top surface and opposite said longitudinal recess;
   longitudinal conveyor belt means arranged in said longitudinal recess with the upper conveyor belt surface substantially co-planar with said top surface; and
   a rotary sacking platform mounted in said circular recess with the upper surface thereof substantially co-planar with said top surface, said planar top surface extending beyond said circular recess and providing stationary sacking platform sections adjoining said rotary platform.

4. A check stand as in claim 3 wherein the said planar top surface extends beyond said belt means to provide stationary supporting bases for auxiliary equipment.

5. A check stand as in claim 3 including deflector means hingedly mounted adjacent said rotary sacking platform and having an overhanging portion for deflecting items from an outer peripheral portion of said rotary sacking platform spirally inward toward the center of said rotary sacking platform, such deflector means being revolvable about its hinge axis to pass flat articles under said portion of said deflector means overhanging the rotary sacking platform.

6. A check stand as in claim 3 including a removable platform segment loosely mounted between the delivery end of said conveyor belt means and said rotary sacking platform for facilitating discharge of items from said conveyor belt means to said sacking platform.

7. An improved compact check stand comprising:
   a substantially horizontal, generally rectangular, planar top surface providing a sorting section at one end and a sacking section at the other end, said top surface having a circular recess in said sacking section and a longitudinal recess extending from said sorting section to a point adjacent said sacking section;
   means defining a checking position between the two ends of said top surface and opposite said longitudinal recess;
   longitudinal conveyor belt means arranged in said longitudinal recess with the upper conveyor belt surface substantially co-planar with said top surface; and
   a rotary sacking platform mounted in said circular recess with the upper surface thereof substantially co-planar with said top surface, said planar top surface extending beyond said circular recess and providing stationary sacking platform sections adjoining said rotary platform, and said planar top surface extending beyond said belt means to provide stationary supporting bases for auxiliary equipment,
   said longitudinal conveyor belt means being arranged at an acute angle with respect to the longitudinal axis of said rectangular planar top, the axis of said conveyor belt means being directed toward the center of rotation of said rotary sacking platform.

8. An improved compact check stand comprising:
   a substantially horizontal planar top surface providing a sorting section at one end and a sacking section at the other end, said top surface having a circular recess in said sacking section and a longitudinal recess extending from said sorting section to a point adjacent said sacking section;
   means defining a checking position between the two ends of said top surface;
   longitudinal conveyor belt means arranged in said longitudinal recess with the upper conveyor belt surface substantially co-planar with said top surface;
   a rotary sacking platform mounted in said circular recess with the upper surface thereof substantially co-planar with said top surface, said planar top surface extending horizontally beyond said circular recess and said rotary sacking platform and providing stationary platform sections adjoining said rotary platform; and deflector means located above the plane of said top surface adjacent the periphery of said rotary sacking platform for forcing items to remain on said rotary sacking platform when they are delivered by said conveyor belt means to said sacking section.

9. An improved compact check stand comprising:

a substantially horizontal planar top surface providing a sorting section at one end and a sacking section at the other end, said top surface having a circular recess in said sacking section and a longitudinal recess extending from said sorting section to a point adjacent said sacking section;

means defining a checking position between the two ends of said top surface;

longitudinal conveyor belt means arranged in said longitudinal recess with the upper conveyor belt surface substantially co-planar with said top surface;

a rotary sacking platform mounted in said circular recess with the upper surface thereof substantially co-planar with said top surface;

first deflector means located above the plane of said top surface adjacent the periphery of said rotary sacking platform and on one side of said conveyor belt for forcing items to remain on said rotary sacking platform as they are delivered by said conveyor belt means to said sacking section; and second deflector means located above the plane of said top surface and overhanging the peripheral portion of said rotary sacking platform for deflecting items from said outer peripheral portion spirally toward the center of said rotary sacking platform, said second deflector means being hingedly mounted adjacent said checking position, whereby said second deflector means can be revolved about its hinge axis to pass flat articles thereunder without damage to the packaging containing said flat article.

10. An improved compact check stand comprising:

a substantially horizontal planar top surface providing a sorting section at one end and a sacking section at the other end, said top surface having a circular recess in said sacking section and a longitudinal recess extending from said sorting section to a point adjacent said sacking section;

means defining a checking position between the two ends of said top surface;

longitudinal conveyor belt means arranged in said longitudinal recess with the upper conveyor belt surface substantially co-planar with said top surface;

a rotary sacking platform mounted in said circular recess with the upper surface thereof substantially co-planar with said top surface;

a levelled removable platform segment movably mounted between the delivery end of said conveyor belt means and said rotary sacking platform for facilitating discharge of items from said conveyor belt means onto said rotary sacking platform so that flat objects unexpectedly adhering to said conveyor belt means will force said platform segment away from said conveyor belt means to avoid uncontrolled stoppage of said conveyor belt.

References Cited in the file of this patent

UNITED STATES PATENTS

| | | |
|---|---|---|
| 1,092,240 | Bennett | Apr. 7, 1914 |
| 1,224,475 | Logan | May 1, 1917 |
| 1,430,766 | Stebler | Oct. 3, 1922 |
| 1,486,839 | Morrison | Mar. 11, 1924 |
| 2,235,941 | Montgomery | Mar. 25, 1941 |
| 2,317,438 | Bradley | Apr. 27, 1943 |
| 2,569,711 | Foster | Oct. 2, 1951 |
| 2,599,909 | George | June 10, 1952 |
| 2,625,256 | Smith | Jan. 13, 1953 |
| 2,631,689 | Rubaloff | Mar. 17, 1953 |
| 2,723,728 | Crawford | Nov. 15, 1955 |
| 2,871,984 | Colman | Feb. 3, 1959 |